US009417488B2

(12) United States Patent
Kim et al.

(10) Patent No.: US 9,417,488 B2
(45) Date of Patent: Aug. 16, 2016

(54) LIQUID CRYSTAL DISPLAY DEVICE

(71) Applicant: Samsung Display Co., Ltd., Yongin, Gyeonggi-Do (KR)

(72) Inventors: Jin Won Kim, Suwon-si (KR); Oh Jeong Kwon, Hwaseong-si (KR); Hyeok Jin Lee, Seongnam-si (KR); Ki Chul Shin, Seongnam-si (KR)

(73) Assignee: Samsung Display Co., Ltd., Samsung-ro, Giheung-Gu, Yongin-si, Gyeonggi-Do (KR)

( * ) Notice: Subject to any disclaimer, the term of this patent is extended or adjusted under 35 U.S.C. 154(b) by 0 days.

(21) Appl. No.: 14/634,458

(22) Filed: Feb. 27, 2015

(65) Prior Publication Data
US 2016/0103370 A1    Apr. 14, 2016

(30) Foreign Application Priority Data

Oct. 14, 2014  (KR) .................. 10-2014-0138245

(51) Int. Cl.
*G02F 1/1343* (2006.01)
*G02F 1/1337* (2006.01)

(52) U.S. Cl.
CPC .... *G02F 1/134309* (2013.01); *G02F 1/133711* (2013.01); *G02F 2001/133726* (2013.01); *G02F 2001/134345* (2013.01)

(58) Field of Classification Search
CPC ........................................... G02F 2001/134345
See application file for complete search history.

(56) References Cited

U.S. PATENT DOCUMENTS

| 8,305,531 B2 | 11/2012 | Seong et al. |
| 8,373,814 B2 | 2/2013 | Jung et al. |
| 2010/0157232 A1* | 6/2010 | Kim ...................... G02F 1/1393 349/144 |

FOREIGN PATENT DOCUMENTS

| KR | 1020110111212 A | 10/2011 |
| KR | 1020110111227 A | 10/2011 |
| KR | 1020130101325 A | 9/2013 |
| KR | 101319543 B1 | 10/2013 |
| KR | 1020130125638 A | 11/2013 |

* cited by examiner

*Primary Examiner* — Phu Vu
(74) *Attorney, Agent, or Firm* — Robert E. Bushnell, Esq.

(57) ABSTRACT

A liquid crystal display includes: a flexible first substrate; a pixel electrode positioned on the first substrate and including an outer stem with a quadrangular shape, a crossed-shape stem including a transverse stem positioned inside the outer stem and a longitudinal stem crossing the transverse stem, and a plurality of minute branches extending from the outer stem and the crossed-shape stem; a flexible second substrate facing the first substrate; a common electrode positioned on the second substrate; and a liquid crystal layer including liquid crystal molecules interposed between the first substrate and the second substrate. An angle formed by minute branches of one sub-region of the pixel electrode positioned at second, third and fourth zones and the transverse stem is smaller than an angle formed by minute branches of three other sub-regions of the pixel electrode positioned at the second, third, and fourth zones and the transverse stem.

20 Claims, 19 Drawing Sheets

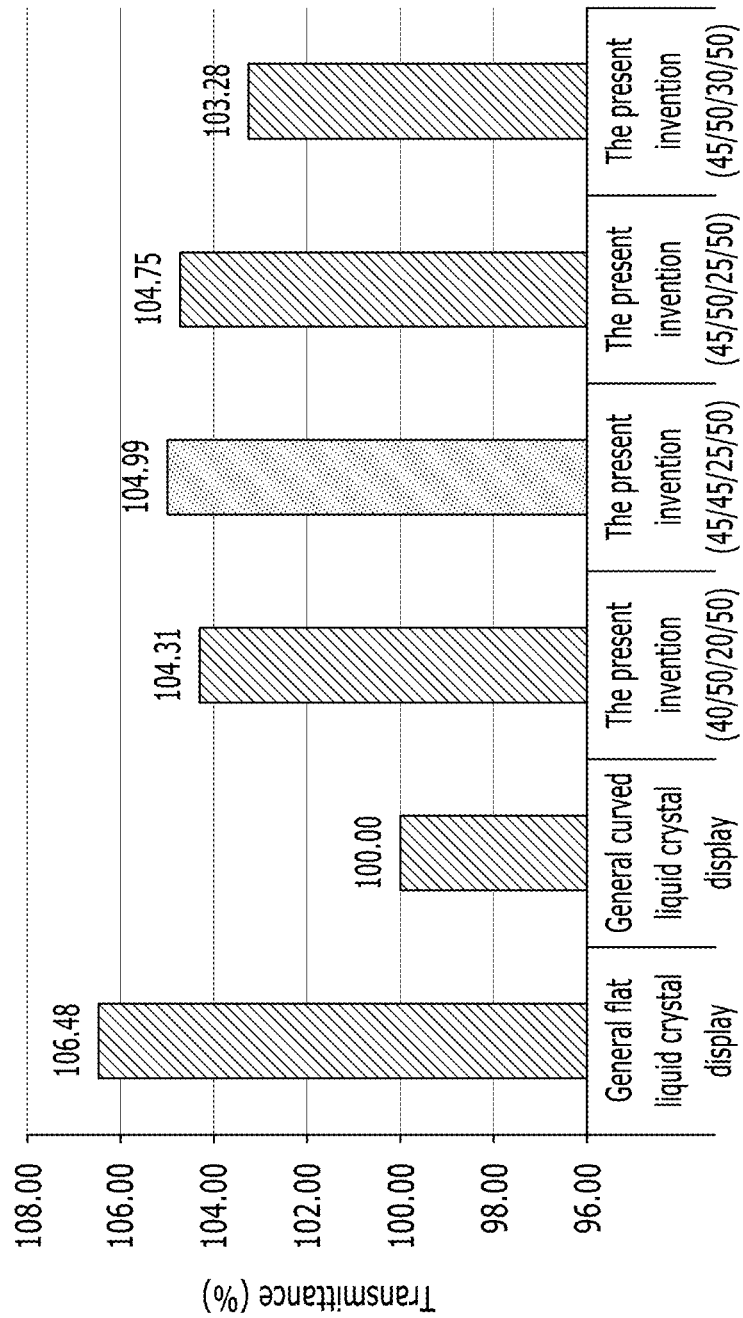

LIQUID CRYSTAL DISPLAY DEVICE

CLAIM OF PRIORITY

This application claims priority to and the benefit of Korean Patent Application No. 10-2014-0138245 filed in the Korean Intellectual Property Office on Oct. 14, 2014, the entire contents of which are incorporated herein by reference.

BACKGROUND OF THE INVENTION

1. Field of the Invention

The present invention relates to a liquid crystal display (LCD). More particularly, the present invention relates to a liquid crystal display with reduced texture generated by misalignment of an upper panel and a lower panel in the liquid crystal display.

2. Description of the Related Art

A liquid crystal display is one of flat panel displays that are now widely used. The liquid crystal display includes two display panels in which field generating electrodes such as pixel electrodes and a common electrode are formed, and a liquid crystal layer interposed between the display panels. In the liquid crystal display, a voltage is applied to the field generating electrodes to generate an electric field in the liquid crystal layer, which determines the direction of liquid crystal molecules of the liquid crystal layer, and an image is displayed by controlling the polarization of incident light.

Among the LCDs, a vertical alignment (VA) mode LCD, which aligns LC molecules such that the long axes thereof are perpendicular to the panels in the absence of an electric field, has been developed.

In the VA mode LCD, a wide viewing angle which is an important characteristic can be realized by forming cutouts such as minute slits in the field-generating electrodes. Since the cutouts and protrusions can determine the tilt directions of the LC molecules, the tilt directions can be distributed in various directions by using the cutouts and protrusions such that the reference viewing angle is widened.

To increase response speed of the liquid crystal display, various initial alignment methods for pretilting liquid crystal molecules have been proposed. Among the various initial alignment methods, in an alignment method in which prepolymers polymerized by light such as ultraviolet rays are used to pretilt the liquid crystal molecules, the field generating electrodes are respectively applied with desired voltages and are then exposed to the light.

On the other hand, recently, the liquid crystal displays have been becoming wider, and curved display devices are being developed to enhance immersion of viewers.

After performing the above-described initial alignment to manufacture the flat liquid crystal display, when the flat liquid crystal display is bent through a bending process to realize the curved liquid crystal display, a misalignment is generated between two display panels, and this causes a texture.

The above information disclosed in this Background section is only for enhancement of an understanding of the background of the invention, and therefore it may contain information that does not form the prior art that is already known in this country to a person of ordinary skill in the art.

SUMMARY OF THE INVENTION

The present invention provides a liquid crystal display with reduced texture generated by a misalignment of an upper panel and a lower panel in the liquid crystal display.

A liquid crystal display according to an exemplary embodiment of the present invention includes: a flexible first substrate; a pixel electrode positioned on the first substrate and including an outer stem with a quadrangular shape, a crossed-shape stem including a transverse stem positioned inside the outer stem and a longitudinal stem crossing the transverse stem, and a plurality of minute branches extending from the outer stem and the crossed-shape stem; a flexible second substrate facing the first substrate; a common electrode positioned on the second substrate; and a liquid crystal layer including liquid crystal molecules interposed between the first substrate and the second substrate, wherein the liquid crystal display includes a first zone positioned at a center thereof, a second zone positioned at a right side of the first zone, a third zone positioned at the right side of the second zone, and a fourth zone positioned at the right side of the third zone, the pixel electrode including a first sub-region positioned at a leftmost side, a second sub-region positioned at the right side of the first sub-region, a third sub-region positioned at the right side of the second sub-region, and a fourth sub-region positioned at the right side of the third sub-region, and an angle formed by the minute branches of the third sub-region of the pixel electrode being positioned at the second, the third, and the fourth zones and the transverse stem is smaller than an angle formed by the minute branches of the first, second, and fourth sub-regions of the pixel electrode positioned at the second, the third, and the fourth zones and the transverse stem.

The angle formed by the minute branches of the first sub-region of the pixel electrode positioned at the second, third, and fourth zones and the transverse stem may be more than 35 degrees to less than 45 degrees; the angle formed by the minute branches of the second sub-region of the pixel electrode positioned at the second, third and fourth zones and the transverse stem may be more than 45 degrees to less than 80 degrees; the angle formed by the minute branches of the third sub-region of the pixel electrode positioned at the second, third and fourth zones and the transverse stem may be more than 10 degrees to less than 40 degrees; and the angle formed by the minute branches of the fourth sub-region of the pixel electrode positioned at the second, third and fourth zones and the transverse stem may be more than 45 degrees to less than 70 degrees.

The width of the second sub-region and the third sub-region may be widened from the second zone to the fourth zone.

The width of the second sub-region may be the same as the width of the third sub-region.

The width of the second sub-region and the third sub-region in the third zone may be two times the width of the second sub-region and the third sub-region in the second zone, and the width of the second sub-region and the third sub-region in the fourth zone may be three times the width of the second sub-region and the third sub-region in the second zone.

The width of the first sub-region and the fourth sub-region may be decreased from the second zone to the fourth zone.

The width of the first sub-region may be the same as the width of the fourth sub-region.

The width from the first zone to the fourth zone may be constant.

The angle formed by the minute branches of the first, the second, the third, and the fourth sub-region of the pixel electrode positioned at the first zone and the transverse stem may be constant.

The angle formed by the minute branches of the pixel electrode positioned at the first zone and the transverse stem may be more than 40 degrees to less than 45 degrees.

The longitudinal stem may be positioned at a boundary between the second sub-region and the third sub-region.

The boundary between the first sub-region and the second sub-region and the boundary between the third sub-region and the fourth sub-region may be parallel to the longitudinal stem.

The first substrate and the second substrate may be curved according to a first direction.

The first direction may be parallel to the transverse stem.

The first substrate and the second substrate may have a constant curvature.

The boundary between the first zone and the second zone, the boundary between the second zone and the third zone, and the boundary between the third zone and the fourth zone may be parallel to the longitudinal stem.

The first substrate may further include a fifth zone positioned at the left side of the first zone, a sixth zone positioned at the left side of the fifth zone, and a seventh zone positioned at the left side of the sixth zone.

A shape of the minute branches of the pixel electrode positioned at the fifth zone may be symmetrical with respect to a shape of the minute branches of the pixel electrode positioned at the second zone, a shape of the minute branches of the pixel electrode positioned at the sixth zone may be symmetrical with respect to the minute branches of the pixel electrode positioned at the third zone, and a shape of the minute branches of the pixel electrode positioned at the seventh zone may be symmetrical with respect to a shape of the minute branches of the pixel electrode positioned at the fourth zone.

The liquid crystal layer may include liquid crystal molecules and a reactive mesogen.

The liquid crystal display according to an exemplary embodiment of the present invention may further include: a first alignment layer positioned on the first substrate; and a second alignment layer positioned on the second substrate, wherein the first alignment layer and the second alignment layer may be made of an alignment material including the reactive mesogen.

The liquid crystal display according to an exemplary embodiment of the present invention has the following effects.

The present invention differentiates the angle between the minute branches and the transverse stem of the partial pixel electrode for each region, thereby preventing the texture which would otherwise be generated by the misalignment of the upper and lower panels of the curved liquid crystal display.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein:

FIG. 22 is a graph showing transmittance of the general liquid crystal display and the liquid crystal display according to an exemplary embodiment of the present invention of FIG. 21.

DETAILED DESCRIPTION OF THE EMBODIMENTS

Figure 1:
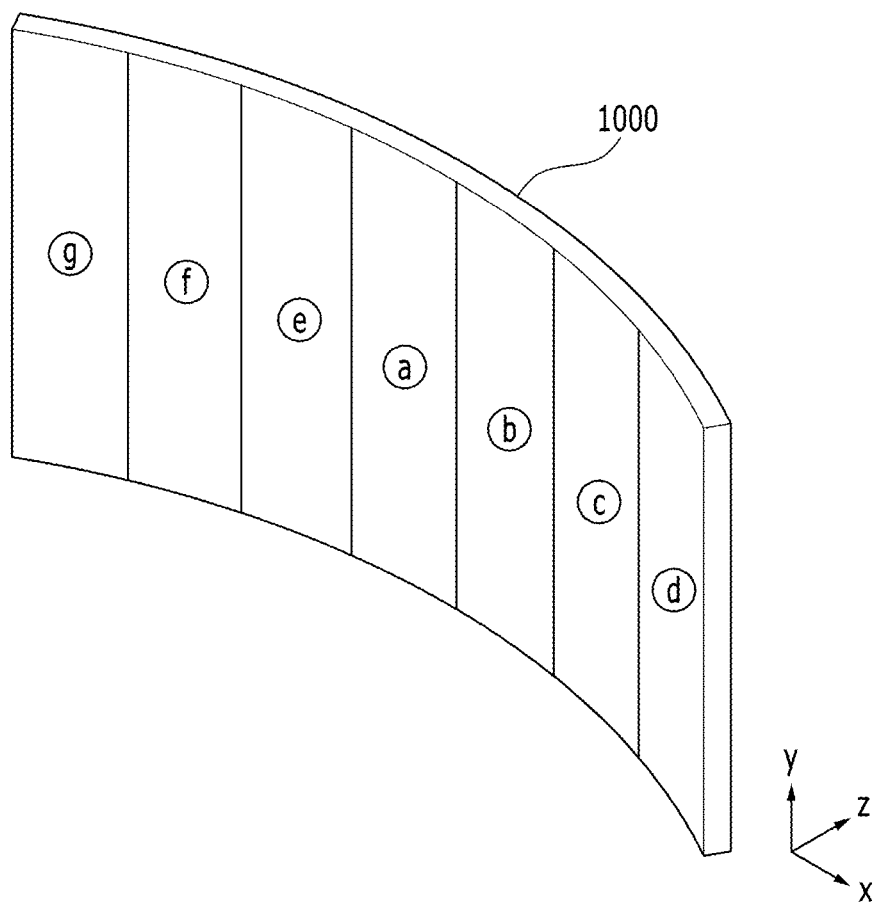
FIG. 1 is a perspective view of a liquid crystal display according to an exemplary embodiment of the present invention.

The present invention will be described more fully hereinafter with reference to the accompanying drawings, in which exemplary embodiments of the invention are shown. As those skilled in the art will realize, the described embodiments may be modified in various different ways, all without departing from the spirit or scope of the present invention.

In the drawings, the thickness of layers, films, panels, regions, etc. are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

First, a liquid crystal display according to an exemplary embodiment of the present invention will be described with reference to FIG. 1 to FIG. 3.

Figure 2:
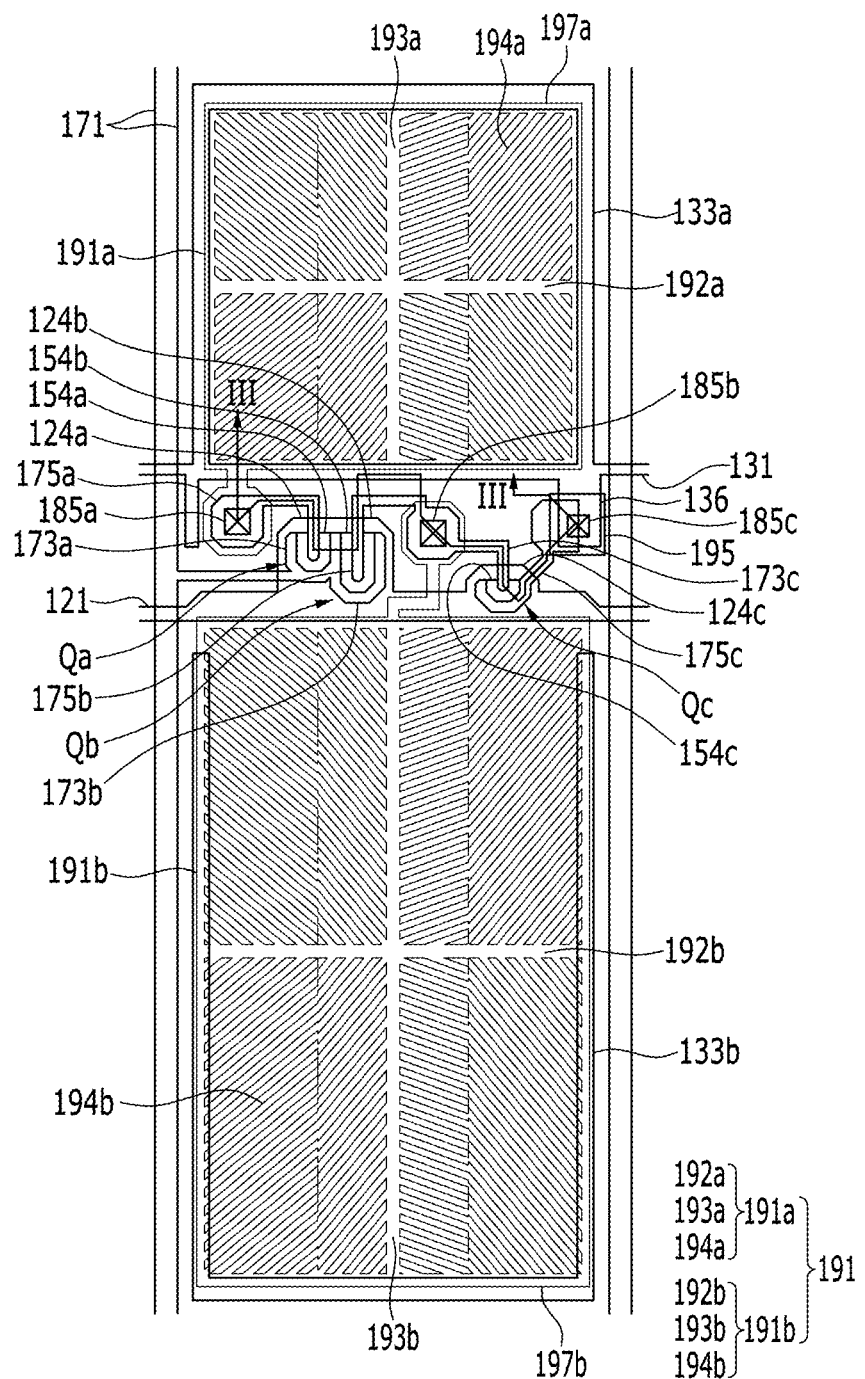
FIG. 2 is a layout view of a liquid crystal display according to an exemplary embodiment of the present invention.
Figure 3:
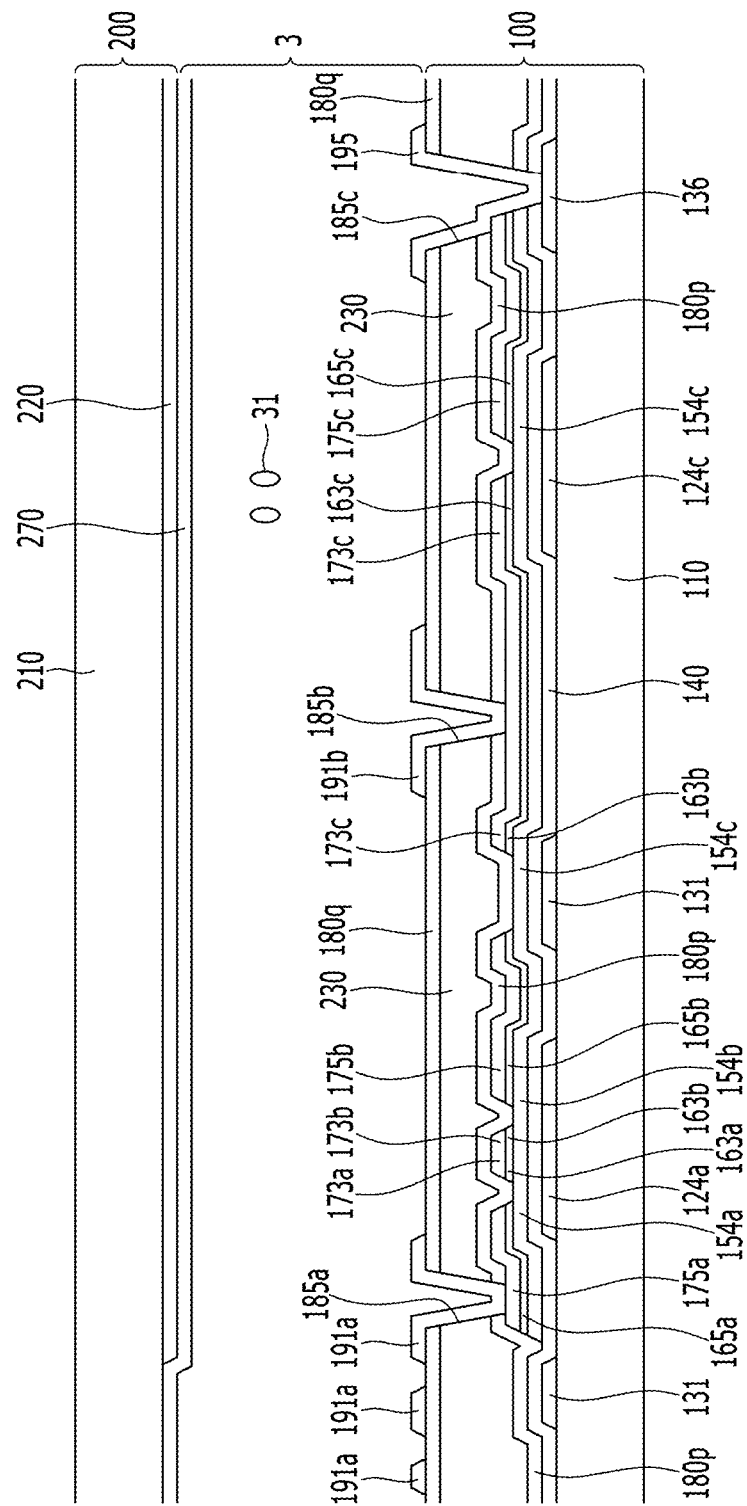
FIG. 3 is a cross-sectional view of the liquid crystal display of FIG. 2 taken along a line III-III.

FIG. 1 is a perspective view of a liquid crystal display according to an exemplary embodiment of the present invention, FIG. 2 is a layout view of a liquid crystal display according to an exemplary embodiment of the present invention, and FIG. 3 is a cross-sectional view of the liquid crystal display of FIG. 2 taken along a line III-III.

As shown in FIG. 1, a liquid crystal display 1000 according to an exemplary embodiment of the present invention is not a flat display device with a flat shape, but is a curved display device with a curve shape that is bent with a predetermined curvature. That is, the liquid crystal display 1000 according to an exemplary embodiment of the present invention may be formed of the curved liquid crystal display having a positive curvature.

In a case of the flat display device, distances from an eye of a viewer to a plurality of pixels included in the display device are respectively different from each other. For example, the distance may be farther with respect to pixels positioned at the right and left edges from the eye of the viewer than the distance with respect to a pixel positioned at the center of the flat display device. In contrast, in the case of the curved display device, when a center of a circle formed by extending a curved surface is a position of the eye of the viewer, the distances from the eye of the viewer to a plurality of pixels are approximately constant. Since this curved surface display device has a wide viewing angle compared with the flat display device, a large amount of information stimulates a photoreceptor such that more visual information is transmitted to a brain through an optic nerve. Accordingly, a realistic, immersive view may be further enhanced.

The liquid crystal display 1000 according to an exemplary embodiment of the present invention is bent according to an x-axis direction. The liquid crystal display 1000 may be divided into seven zones (ⓐ, ⓑ, ⓒ, ⓓ, ⓔ, ⓕ, and ⓖ) according to an x-axis direction. The first zone (ⓐ) is positioned centermost on the liquid crystal display 1000, the second zone (ⓑ) is positioned at a right side of the first zone (ⓐ), the third zone (ⓒ) is positioned at a right side of the second zone (ⓑ), and the fourth zone (ⓓ) is positioned at a right side of the third zone (ⓒ). The fifth zone (ⓔ) is positioned at a left side of the first zone (ⓐ), the sixth zone (ⓕ) is positioned at a left side of the fifth zone (ⓒ), and the seventh zone (ⓖ) is positioned at a left side of the sixth zone (ⓕ).

The boundaries dividing the first to seventh zones (ⓐ, ⓑ, ⓒ, ⓓ, ⓔ, ⓕ, and ⓖ) are parallel in the y-axis direction. That is, the boundary between the first zone (ⓐ) and the second zone (ⓑ), the boundary between the second zone (ⓑ) and the third zone (ⓒ), and the boundary between the third zone (ⓒ) and the fourth zone (ⓓ) are formed in the direction parallel to the y-axis.

The first to seventh zones (ⓐ, ⓑ, ⓒ, ⓓ, ⓔ, ⓕ, and ⓖ) may be formed with the same width. The second, the third, and the fourth zones (ⓑ, ⓒ, and ⓓ) and the fifth to seventh zones (ⓔ, ⓕ, and ⓖ) positioned at opposite sides with respect to the first zone (ⓐ) are symmetrical with respect to each other.

As shown in FIG. 2 and FIG. 3, the liquid crystal display according to an exemplary embodiment of the present invention includes a lower panel 100 and an upper panel 200 facing each other, and a liquid crystal layer 3 interposed between the two display panels 100 and 200.

First, the lower panel 100 will be described with reference to FIG. 2 and FIG. 3.

A gate line 121 and a reference voltage line 131 are formed on an insulation substrate 110 made of transparent glass or plastic.

The gate line 121 mainly extends in a horizontal direction and transmits a gate signal. The gate line 121 includes a first gate electrode 124a, a second gate electrode 124b, and a third gate electrode 124c.

The reference voltage line 131 mainly extends in a horizontal direction and transmits a predetermined voltage such as a reference voltage. The reference voltage line 131 includes a first storage electrode 133a enclosing a first sub-pixel electrode 191a that will be described later, and a second storage electrode 133b enclosing a second sub-pixel electrode 191b that will be described later. Although not shown in FIG. 1, a horizontal portion of the first storage electrode 133a and a horizontal portion of the second storage electrode 133b of a previous pixel may be integrally formed. Also, the reference voltage line 131 further includes an expansion 136 to be protruded toward the gate line 121. The expansion 136 is connected to a third drain electrode 175c that will be described later.

A gate insulating layer 140 (FIG. 3) is formed on the gate line 121 (FIG. 2), the reference voltage line 131 (FIGS. 2 and 3), and the first and second storage electrodes 133a and 133b (FIG. 2).

A first semiconductor 154a, a second semiconductor 154b, and a third semiconductor 154c made of amorphous silicon or crystalline silicon are formed on the gate insulating layer 140 (see FIG. 3).

A plurality of ohmic contacts 163a, 163b, 163c, 165a, 165b, and 165b are formed on the first semiconductor 154a, the second semiconductor 154b, and the third semiconductor 154c (see FIG. 3). When the semiconductors 154a, 154b, and 154c are oxide semiconductors, the ohmic contacts 163a, 163b, 163c, 165a, 165b, and 165b may be omitted.

A data conductor (171, 173a, 173b 173c, 175a, 175b, and 175c) including a data line 171 and including a first source electrode 173a, a second source electrode 173b, a first drain electrode 175a, a second drain electrode 175b, a third source electrode 173c, and a third drain electrode 175c is formed on the ohmic contacts 163a, 163b, 163c, 165a, 165b, and 165b and the gate insulating layer 140 (see FIG. 2 and FIG. 3). The third drain electrode 175c partially overlaps the expansion 136 of the reference voltage line 131.

The second drain electrode 175b is connected to the third source electrode 173c.

The first gate electrode 124a, the first source electrode 173a, and the first drain electrode 175a form a first thin film transistor Qa together with the first semiconductor 154a, and a channel of the first thin film transistor Qa is formed in the first semiconductor 154a between the first source electrode 173a and the first drain electrode 175a.

Similar to the above, the second gate electrode 124b, the second source electrode 173b, and the second drain electrode 175b form a second thin film transistor Qb together with the second semiconductor 154b, and a channel of the second thin film transistor Qb is formed in the second semiconductor 154b between the second source electrode 173b and the second drain electrode 175b. Further, the third gate electrode 124c, the third source electrode 173c, and the third drain electrode 175c form a third thin film transistor Qc together with the third semiconductor 154c, and a channel of the third thin film transistor Qc is formed in the third semiconductor 154c between the third source electrode 173c and the third drain electrode 175c.

A first passivation layer 180p made of an inorganic insulator, such as silicon nitride (SiNx) or silicon oxide (SiOx), is formed on the data conductor (171, 173a, 173b 173c, 175a, 175b, and 175c) and the exposed semiconductors 154a, 154b, and 154c.

A color filter 230 is positioned on the first passivation layer 180p. The color filter 230 may be elongated according to a column of the pixel electrode 191. Each color filter may express one of the primary colors such as three primary colors including red, green, and blue. However, the colors displayed by the color filter 230 are not limited to the three primary colors such as red, green, and blue, and the color filter 230 may express one of cyan, magenta, yellow, and white-based colors.

A second passivation layer 180q is positioned on the color filter 230. The second passivation layer 180q prevents peeling of the color filter 230 and suppresses contamination of the liquid crystal layer 3 by an organic material of the solvent that inflows from the color filter 230, so that it prevents defects such as afterimages that may occur when an image is driven.

The first passivation layer 180p, the color filter 230, and the second passivation layer 180q have a first contact hole 185a exposing the first drain electrode 175a and a second contact hole 185b exposing the second drain electrode 175b. The gate insulating layer 140, the first passivation layer 180p, the color filter 230, and the second passivation layer 180q have a third contact hole 185c exposing the expansion 136 of the reference voltage line 131 and the third drain electrode 175c.

A pixel electrode 191, including the first sub-pixel electrode 191a and the second sub-pixel electrode 191b, is formed on the second passivation layer 180q. Also, a connection electrode 195 made of the same material and the same layer as the pixel electrode 191 is formed. The pixel electrode 191 and the connection electrode 195 may be made of a transparent metal oxide such as ITO (indium tin oxide) and IZO (indium zinc oxide).

The first sub-pixel electrode 191a and the second sub-pixel electrode 191b are adjacent in a column direction, the entire shape thereof is quadrangular, and they include a crossed-shape stem including outer stems 197a and 197b positioned outside the quadrangle, transverse stems 192a and 192b positioned inside the outer stems 197a and 197b, and longitudinal stems 193a and 193b crossing the transverse stems 192a and 192b.

The transverse stems 192a and 192b are formed in the x-axis direction and extend in a direction almost parallel to the gate line 121. Accordingly, the liquid crystal display 1000 is bent in a direction parallel to the transverse stems 192a and 192b. The longitudinal stems 193a and 193b are formed in the y-axis direction and extend in a direction almost parallel to the data line 171. Accordingly, the boundaries dividing the first to seventh zones (ⓐ, ⓑ, ⓒ, ⓓ, ⓔ, ⓕ, and ⓖ) of the liquid crystal display 1000 are parallel to the longitudinal stems 193a and 193b.

Also, the first sub-pixel electrode 191a and the second sub-pixel electrode 191b further include a plurality of minute branches 194a and 194b extending from the outer stems 197a and 197b, the transverse stems 192a and 192b, and the longitudinal stems 193a and 193b.

The minute branches 194a and 194b of the first sub-pixel electrode 191a and the second sub-pixel electrode 191b obliquely extend from the outer stems 197a and 197b, the transverse stems 192a and 192b, and the longitudinal stems 193a and 193b. In this case, the first sub-pixel electrode 191a and the second sub-pixel electrode 191b are divided into a plurality of regions, and a planar shape of the minute branches 194a and 194b positioned in each region will be described with reference to FIG. 4 later.

The connection electrode 195 overlaps the expansion 136 of the reference voltage line 131 and overlaps the third drain electrode 175c. The connection electrode 195 is physically and electrically connected to the expansion 136 of the reference voltage line 131 through the third contact hole 185c, and is physically and electrically connected to the third drain electrode 175c.

The first sub-pixel electrode 191a and the second sub-pixel electrode 191b are physically and electrically connected to the first drain electrode 175a and the second drain electrode 175b through the first contact hole 185a and the second contact hole 185b, thereby being applied with a data voltage from the first drain electrode 175a and the second drain electrode 175b.

An area of the second subpixel electrode 191b may be approximately one to two times larger than that of the first subpixel electrode 191a.

In the above embodiment, one pixel electrode is divided into two sub-pixel electrodes but the present invention is not limited thereto, and one pixel electrode may be formed as a single pixel electrode and may be divided into three or more sub-pixel electrodes. Also, one pixel includes three thin film transistors but the connection structure of three thin film transistors may be variously changed, and one pixel may include less than or more than three thin film transistors.

Next, the upper panel 200 of FIG. 3 will be described.

A light blocking member 220 and a common electrode 270 are formed on an insulation substrate 210 made of transparent glass or plastic.

The light blocking member 220 of FIG. 3 overlaps the gate line 121, the data line 171, and the first to third thin film transistors Qa, Qb, and Qc of FIG. 2. The light blocking member 220 is referred to as a black matrix and prevents light leakage.

However, in the case of a liquid crystal display according to another exemplary embodiment of the present invention, the light blocking member 220 may be disposed on the lower panel 100 of FIG. 3, and in the case of a liquid crystal display according to a further exemplary embodiment of the present invention, a color filter may be disposed on the upper panel 200.

The common electrode 270 may be formed on the entire surface of the substrate 210, and the common electrode 270 may be applied with a predetermined voltage.

Alignment layers (not illustrated) are formed on inside surfaces of the display panels 100 and 200, and the alignment layers may be vertical alignment layers.

Polarizers (not illustrated) are located on outer surfaces of the two display panels 100 and 200, and transmissive axes of the two polarizers are orthogonal to each other and one of the transmissive axes is preferably parallel to the gate line 121. However, a polarizer may be arranged at only the outer surface of either of the two display panels 100 and 200.

The liquid crystal layer 3 has negative dielectric anisotropy, and liquid crystal molecules 31 (FIG. 3) of the liquid crystal layer 3 are aligned such that a long axis thereof forms a right angle with respect to the surfaces of the two display panels 100 and 200 in a state where there is no electric field. Accordingly, in a state where there is no electric field, incident light is blocked without passing through the orthogonal polarizers.

At least one of the liquid crystal layer 3 and the alignment layer may include a photoreactive material, more specifically, a reactive mesogen.

Figure 4:
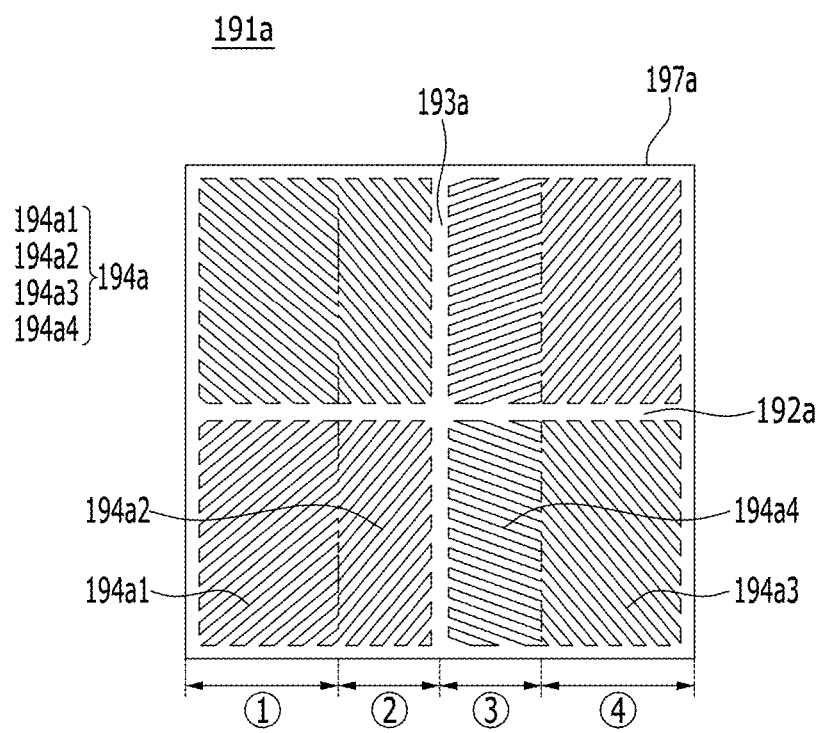
FIG. 4 is a top plan view of a first sub-pixel electrode of one pixel of a liquid crystal display according to an exemplary embodiment of the present invention.
Figure 5:
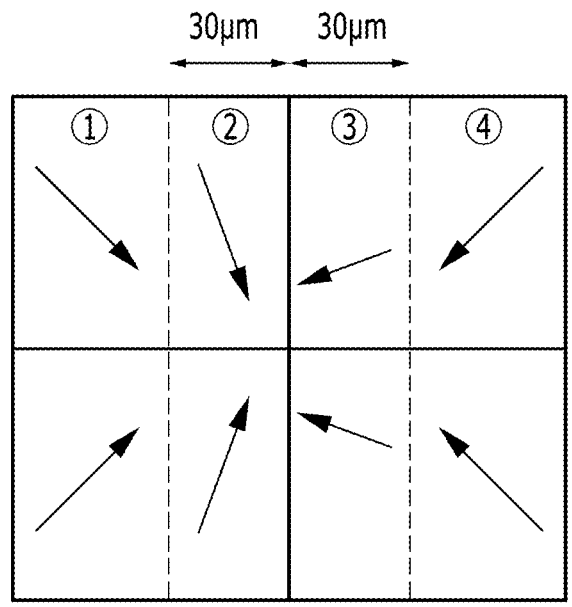
FIG. 5 is a view of pretilt directions of liquid crystal molecules in a lower panel for each angle sub-region of the first sub-pixel electrode of FIG. 4.

Next, a partial pixel structure of the liquid crystal display according to an exemplary embodiment of the present invention will be described with reference to FIG. 4 and FIG. 5. Only the first sub-pixel electrode is shown, and the second sub-pixel electrode is omitted in the following drawings as well as FIG. 4 and FIG. 5 but the second sub-pixel electrode may be formed of a similar shape. FIG. 4 and FIG. 5 show the first sub-pixel electrode 191a positioned at the fourth zone (ⓓ) of the liquid crystal display.

FIG. 4 is a top plan view of a first sub-pixel electrode of one pixel of a liquid crystal display according to an exemplary embodiment of the present invention, and FIG. 5 is a view of pretilt directions of liquid crystal molecules in a lower panel for each angle sub-region of the first sub-pixel electrode of FIG. 4. An arrow direction means a direction that a head of the liquid crystal molecule is facing toward.

As shown in FIG. 4 and FIG. 5, the first sub-pixel electrode 191a positioned at the fourth zone (ⓓ) of the liquid crystal display according to an exemplary embodiment of the present invention may be divided into four sub-regions (①, ②, ③, and ④). The first sub-region (①) is positioned at the leftmost side, the second sub-region (②) is positioned at the right side of the first sub-region (①), the third sub-region (③) is positioned at the right side of the second sub-region (②), and the fourth sub-region (④) is positioned at the right side of the third sub-region (③).

The boundaries between the sub-regions (①, ②, ③, and ④) are parallel to the longitudinal stem 193a. That is, the boundary between the first sub-region (①) and the second sub-region (②), the boundary between the second sub-region (②) and the third sub-region (③), and the boundary between the third sub-region (③) and the fourth sub-region (④) are parallel to the longitudinal stem 193a. The longitudinal stem 193a is positioned at the boundary between the second sub-region (②) and the third sub-region (③).

The width of the first sub-region (①) and the width of the second sub-region (②) may be different, and the width of the third sub-region (③) and the width of the fourth sub-region (④) may be different. The width of the second sub-region (②) and the width of the third sub-region (③) may be the same, and the width of the first sub-region (①) and the width of the fourth sub-region (④) may be the same.

For example, when the first sub-pixel electrode 191a is formed of the quadrangle of a transverse side at 150 μm and a longitudinal side at 150 μm, the width of the first sub-region (①) and the fourth sub-region (④) may be respectively formed at about 45 μm, and the width of the second sub-region (②) and the third sub-region (③) may be respectively formed at about 30 μm.

Minute branches 194a1 of the first sub-region (①) extend from the transverse stem 192a of the first sub-region (①) and the outer stem 197a. The minute branches 194a positioned at the upper side with respect to the transverse stem 192a obliquely extend in the left-upper direction from the transverse stem 192a and obliquely extend in the right-lower direction from the outer stem 197a. The minute branches 194a1 positioned at the lower side with respect to the transverse stem 192a obliquely extend in the left-lower direction from the transverse stem 192a and obliquely extend in the right-upper direction from the outer stem 197a. An angle between the minute branches 194a1 of the first sub-region (①) and the transverse stem 192a is more than about 35 degrees to less than about 45 degrees.

Minute branches 194a2 of the second sub-region (②) extend from the transverse stem 192a of the second sub-region (②) and the longitudinal stem 193a, and the outer stem 197a. The minute branches 194a2 positioned at the upper side with respect to the transverse stem 192a obliquely extend in the left-upper direction from the transverse stem 192a and the longitudinal stem 193a and obliquely extend in the right-lower direction from the outer stem 197a. The minute branches 194a2 positioned at the lower side with respect to the transverse stem 192a obliquely extend in the left-lower direction from the transverse stem 192a and the longitudinal stem 193a and obliquely extend in the right-upper direction from the outer stem 197a. The angle between the minute branches 194a2 of the second sub-region (②) and the transverse stem 192a is more than about 45 degrees to less than about 80 degrees.

Minute branches 194a3 of the third sub-region (③) extend from the transverse stem 192a of the third sub-region (③), the longitudinal stem 193a, and the outer stem 197a. The minute branches 194a3 positioned at the upper side with respect to the transverse stem 192a obliquely extend in the right-upper direction from the transverse stem 192a and the longitudinal stem 193a and obliquely extend in the left-lower direction from the outer stem 197a. The minute branches 194a3 positioned at the lower side with respect to the transverse stem 192a obliquely extend in the right-lower direction from the transverse stem 192a and the longitudinal stem 193a and obliquely extend in the left-upper direction from the outer stem 197a. The angle between the minute branches 194a3 of the third sub-region (③) and the transverse stem 192a is more than about 10 degrees to less than about 40 degrees.

Minute branches 194a4 of the fourth sub-region (④) extend from the transverse stem 192a of the fourth sub-region (④) and the outer stem 197a. The minute branches 194a4 positioned at the upper side with respect to the transverse stem 192a obliquely extend in the right-upper direction from the transverse stem 192a and obliquely extend in the left-lower direction from the outer stem 197a. The minute branches 194a4 positioned at the lower side with respect to the transverse stem 192a obliquely extend in the right-lower direction from the transverse stem 192a and obliquely extend in the left-upper direction from the outer stem 197a. The angle between the minute branches 194a4 of the fourth sub-region (④) and the transverse stem 192a is more than about 45 degrees to less than about 70 degrees.

For example, in FIG. 4, the minute branches 194a1 of the first sub-region (①) form an angle of about 40 degrees with the transverse stem 192a, the minute branches 194a2 of the second sub-region (②) form an angle of about 50 degrees with the transverse stem 192a, the minute branches 194a3 of the third sub-region (③) form an angle of about 20 degrees with the transverse stem 192a, and the minute branches 194a4 of the fourth sub-region (④) form an angle of about 50 degrees with the transverse stem 192a.

As shown in FIG. 5, in the lower panel, the pretilt direction of the liquid crystal molecules is determined by the direction of the minute branches 194a1, 194a2, 194a3, and 194a4 of each sub-region (①, ②, ③, and ④). Accordingly, in the first sub-region (①), the pretilt direction of the lower panel forms an angle of more than about 35 degrees to less than about 45 degrees with the transverse stem 192a. In the second sub-region (①), the pretilt direction of the lower panel forms an angle of more than about 45 degrees to less than about 80 degrees with the transverse stem 192*a*. In the third sub-region (③), the pretilt direction of the lower panel forms an angle of more than about 10 degrees to less than about 40 degrees with the transverse stem 192*a*. In the fourth sub-region (④), the pretilt direction of the lower panel forms an angle of more than about 45 degrees to less than about 70 degrees with the transverse stem 192*a*.

Figure 6:
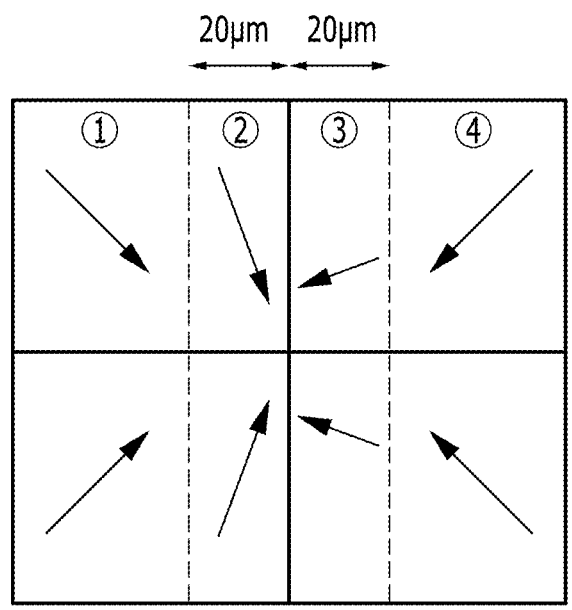
FIG. 6 is a view of pretilt directions of liquid crystal molecules in a lower panel for each angle sub-region of a first sub-pixel electrode positioned at a third zone of a liquid crystal display according to an exemplary embodiment of the present invention.
Figure 7:
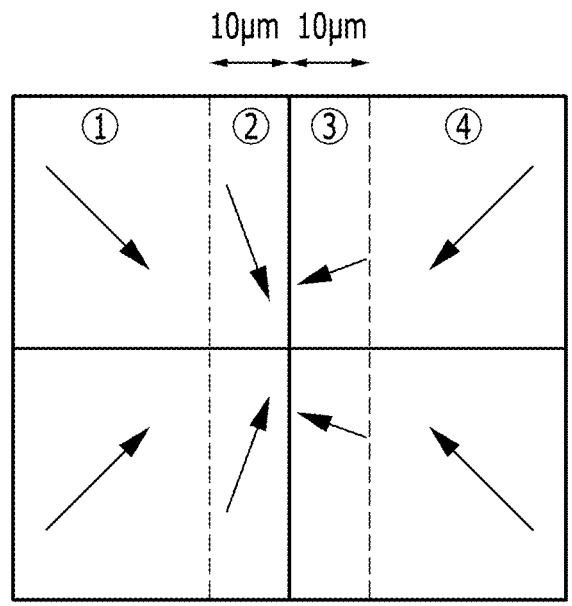
FIG. 7 is a view of pretilt directions of liquid crystal molecules in a lower panel for each angle sub-region of a first sub-pixel electrode positioned at a second zone of a liquid crystal display according to an exemplary embodiment of the present invention.
Figure 8:
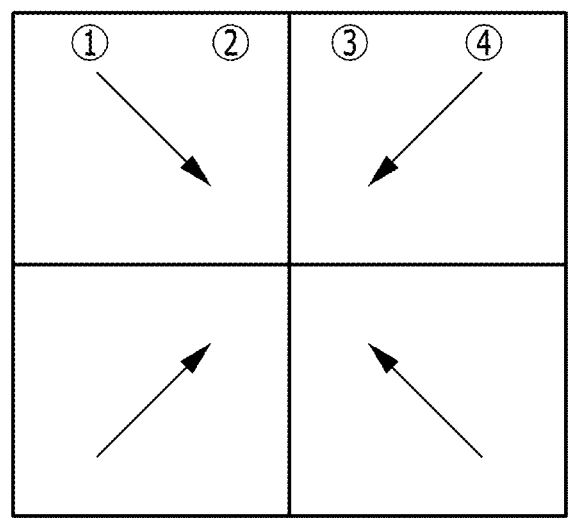
FIG. 8 is a view of pretilt directions of liquid crystal molecules in a lower panel for each angle sub-region of a first sub-pixel electrode positioned at a first zone of a liquid crystal display according to an exemplary embodiment of the present invention.

Next, a structure of the pixel positioned at the first to third zones of the liquid crystal display according to an exemplary embodiment of the present invention will be described with reference to FIG. 6 to FIG. 8. FIG. 6 to FIG. 8 show the first sub-pixel electrode 191*a* positioned at the third zone (ⓒ), the second zone (ⓑ), and the first zone (ⓐ).

FIG. 6 is a view of pretilt directions of liquid crystal molecules in a lower panel for each angle sub-region of a first sub-pixel electrode positioned at a third zone of a liquid crystal display according to an exemplary embodiment of the present invention, FIG. 7 is a view of pretilt directions of liquid crystal molecules in a lower panel for each angle sub-region of a first sub-pixel electrode positioned at a second zone of a liquid crystal display according to an exemplary embodiment of the present invention, and FIG. 8 is a view of pretilt directions of liquid crystal molecules in a lower panel for each angle sub-region of a first sub-pixel electrode positioned at a first zone of a liquid crystal display according to an exemplary embodiment of the present invention.

As shown in FIG. 6, in the third zone (ⓒ) of the liquid crystal display according to an exemplary embodiment of the present invention, the width of the second sub-region (②) and the third sub-region (③) of the first sub-pixel electrode 191*a* is narrower than the width of the second sub-region (②) and the third sub-region (③) of the first sub-pixel electrode 191*a* in the fourth zone (ⓓ). For example, in the third zone (ⓒ), the width of the second sub-region (②) and the third sub-region (③) of the first sub-pixel electrode 191*a* may be respectively formed at about 20 μm.

In the third zone (ⓒ), the entire size of the first sub-pixel electrode 191*a* may be the same as the first sub-pixel electrode 191*a* in the fourth zone (ⓓ). Accordingly, in the third zone (ⓒ), the width of the first sub-region (①) and the fourth sub-region (④) of the first sub-pixel electrode 191*a* is wider than the width of the first sub-region (①) and the fourth sub-region (④) of the first sub-pixel electrode 191*a* in the fourth zone (ⓓ).

In the third zone (ⓒ), the formation direction of the minute branches 194*a* in each sub-region (①, ②, ③, and ④) of the first sub-pixel electrode 191*a* is respectively the same as the formation direction of the minute branches 194*a* in each sub-region (①, ②, ③, and ④) of the first sub-pixel electrode 191*a* in the fourth zone (ⓓ). Accordingly, in the third zone (ⓒ), the pretilt direction of the lower panel of each sub-region (①, ②, ③, and ④) of the first sub-pixel electrode 191*a* is the same as the pretilt direction of the lower panel of each sub-region (①, ②, ③, and ④) of the first sub-pixel electrode 191*a* in the fourth zone (ⓓ). However, for the width of each sub-region (①, ②, ③, and ④), the third zone (ⓒ) and the fourth zone (ⓓ) have a difference.

As shown in FIG. 7, in the second zone (ⓑ) of the liquid crystal display according to an exemplary embodiment of the present invention, the width of the second sub-region (②) and the third sub-region (③) of the first sub-pixel electrode 191*a* is narrower than the width of the second sub-region (②) and the third sub-region (③) of the first sub-pixel electrode 191*a* in the third zone (ⓒ). For example, the width of the second sub-region (②) and the third sub-region (③) of the first sub-pixel electrode 191*a* in the second zone (ⓑ) may be formed at about 10 μm.

In the second zone (ⓑ), the entire size of the first sub-pixel electrode 191*a* may be the same as the first sub-pixel electrode 191*a* of the third zone (ⓒ). Accordingly, the width of the first sub-region (①) and the fourth sub-region (④) of the first sub-pixel electrode 191*a* in the second zone (ⓑ) is wider than the width of the first sub-region (①) and the fourth sub-region (④) of the first sub-pixel electrode 191*a* in the third zone (ⓒ).

The formation direction of the minute branches 194*a* in each sub-region (①, ②, ③, and ④) of the first sub-pixel electrode 191*a* in the second zone (ⓑ) is the same as the formation direction of the minute branches 194*a* in each sub-region (①, ②, ③, and ④) of the first sub-pixel electrode 191*a* in the third zone (ⓒ). Accordingly, the pretilt direction of the lower panel of each sub-region (①, ②, ③, and ④) of the first sub-pixel electrode 191*a* in the second zone (ⓑ) is the same as the pretilt direction of the lower panel of each sub-region (①, ②, ③, and ④) of the first sub-pixel electrode 191*a* in the third zone (ⓒ). However, for the width of each sub-region (①, ②, ③, and ④), the second zone (ⓑ) and the third zone (ⓒ) have a difference.

In summary of FIG. 5 to FIG. 7, the width of the second sub-region (②) and the third sub-region (③) is widened from the second zone (ⓑ) to the fourth zone (ⓓ) and the width of the first sub-region (①) and the fourth sub-region (④) becomes narrower. For example, the width of the second sub-region (②) and the third sub-region (③) in the third zone (ⓒ) may be about two times the width of the second sub-region (②) and the third sub-region (③) in the second zone (ⓑ). Also, the width of the second sub-region (②) and the third sub-region (③) in the fourth zone (ⓓ) may be about three times the width of the second sub-region (②) and the third sub-region (③) in the second zone (6).

As shown in FIG. 8, in the first zone (ⓐ) of the liquid crystal display according to an exemplary embodiment of the present invention, the first sub-region (①) and the second sub-region (②) of the first sub-pixel electrode 191*a* are not divided, but may be formed as one body. Also, in the first zone (ⓐ), the third sub-region (③) and the fourth sub-region (④) of the first sub-pixel electrode 191*a* are not divided, but may be formed as one body.

In the first zone (ⓐ), the angle between the minute branches and the transverse stem of the first to fourth sub-regions (①, ②, ③, and ④) of the first sub-pixel electrode 191*a* is constant. In the first zone (ⓐ), the angle between the minute branches and the transverse stem of the first to fourth sub-regions (①, ②, ③, and ④) of the first sub-pixel electrode 191*a* may be more than about 40 degrees to less than about 45 degrees. Accordingly, In the first zone (ⓐ), the pretilt direction of the lower panel of the first to fourth sub-regions (①, ②, ③, and ④) of the first sub-pixel electrode 191*a* may be more than about 40 degrees to less than about 45 degrees.

In summary of FIG. 5 to FIG. 8, the shape of the minute branches of the pixel electrode of the liquid crystal display according to an exemplary embodiment of the present invention is differently formed for each zone (ⓐ, ⓑ, ⓒ, ⓓ, ⓔ, ⓕ, and ⓖ).

The description and the showing of the shape of the minute branches of the pixel electrode are omitted in the fifth zone (ⓔ), the sixth zone (ⓕ), and the seventh zone (ⓖ), and the shape is symmetrical to the shape of the minute branches of the pixel electrode in the second zone (ⓑ), the third zone (ⓒ), and the fourth zone (ⓓ). The fifth to seventh zones (ⓔ, ⓕ, and ⓖ) and the second, the third, and the fourth zones (ⓑ, ⓒ, and ⓓ) form y-axis symmetry, and the y-axis as the symmetry reference means a longitudinal line positioned at the center of the liquid crystal display. Also, the y-axis is the direction parallel to the longitudinal stem of the pixel electrode.

The shape of the minute branches of the pixel electrode positioned at the fifth zone (ⓔ) is symmetrical to the shape of the minute branches of the pixel electrode positioned at the second zone (ⓑ). The shape of the minute branches of the pixel electrode positioned at the sixth zone (ⓕ) is symmetrical to the shape of the minute branches of the pixel electrode positioned at the third zone (ⓒ). The shape of the minute branches of the pixel electrode positioned at the seventh zone (ⓖ) is symmetrical to the shape of the minute branches of the pixel electrode positioned at the fourth zone (ⓓ).

Next, an operation of the liquid crystal display according to an exemplary embodiment of the present invention will be described with reference to FIG. 9 as well as FIG. 2.

Figure 9:
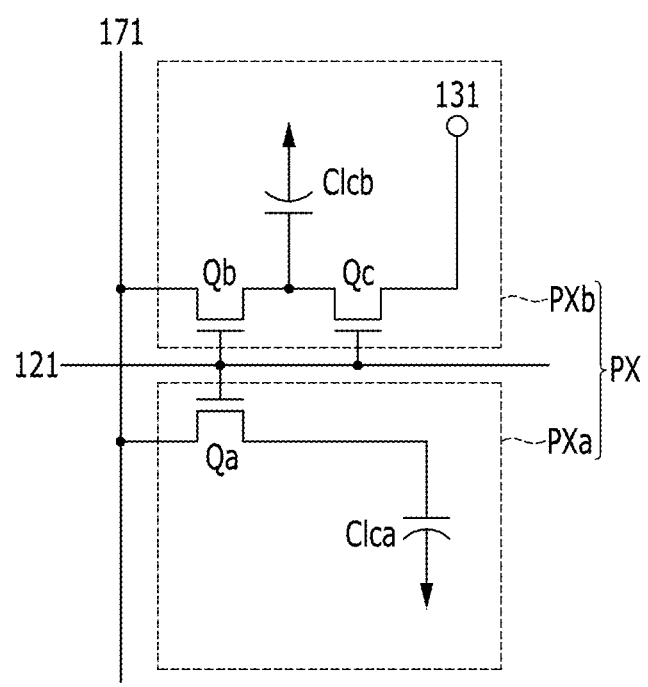
FIG. 9 is an equivalent circuit diagram of one pixel of a liquid crystal display according to an exemplary embodiment of the present invention.

FIG. 9 is an equivalent circuit diagram of one pixel of a liquid crystal display according to an exemplary embodiment of the present invention.

The first thin film transistor Qa and the second thin film transistor Qb connected to the same gate line 121 and the same data line 171 are formed. Also, the third thin film transistor (Qc) connected to the same gate line 121 as the first and second thin film transistors Qa and Qb and connected to the second thin film transistor Qb and the reference voltage line 131 is further formed.

Each pixel PX includes two subpixels PXa and PXb, the first subpixel PXa including the first liquid crystal capacitor Clca connected to the first thin film transistor Qa, and the second subpixel PXb including the second liquid crystal capacitor Clcb connected to the second switching element Qb.

When a gate-on voltage is applied to the gate line 121, the gate-on voltage is applied to a first gate electrode 124a, a second gate electrode 124b, and a third gate electrode 124c so as to turn on all of the first to third switching elements Qa, Qb, and Qc. Therefore, a data voltage transferred through the data line 171 is applied to a third subpixel electrode 191a and the fourth subpixel electrode 191b through the first switching element Qa and the second switching element Qb. Accordingly, the first liquid crystal capacitor Clca and the second liquid crystal capacitor Clcb are charged.

In this case, since the third switching element Qc is turned on, the data voltage transmitted to the second subpixel PXb through the data line 171 is divided through the third switching element Qc connected in series to the second switching element Qb. At this time, the voltage is distributed according to sizes of channels of the second switching element Qb and the third switching element Qc. Accordingly, even though the data voltages transmitted to the first subpixel PXa and the second subpixel PXb through the data lines 171 are the same, different voltages are charged in the first liquid crystal capacitor Clca and the second liquid crystal capacitor Clcb. That is, the voltage charged in the second liquid crystal capacitor Clcb is lower than the voltage charged in the first liquid crystal capacitor Clca. Accordingly, side visibility can be improved based on different voltages charged in the first and second subpixels PXa and PXb within the same pixel PX.

In the liquid crystal display according to an exemplary embodiment of the present invention, the connection relationship of each of the constituent elements may be variously changed. Various structures to differentiate the voltages charged to the first liquid crystal capacitor Clca and the second liquid crystal capacitor Clcb may be realized, and one pixel may include one liquid crystal capacitor.

On the other hand, as described above, at least one of the liquid crystal layer 3 and the alignment layer may include a photoreactive material, in detail, a reactive mesogen. Next, a method of initially aligning liquid crystal molecules 31 of FIG. 3 so as to have the pretilt by using the photoreactive material will be described with reference to FIG. 10.

Figure 10:
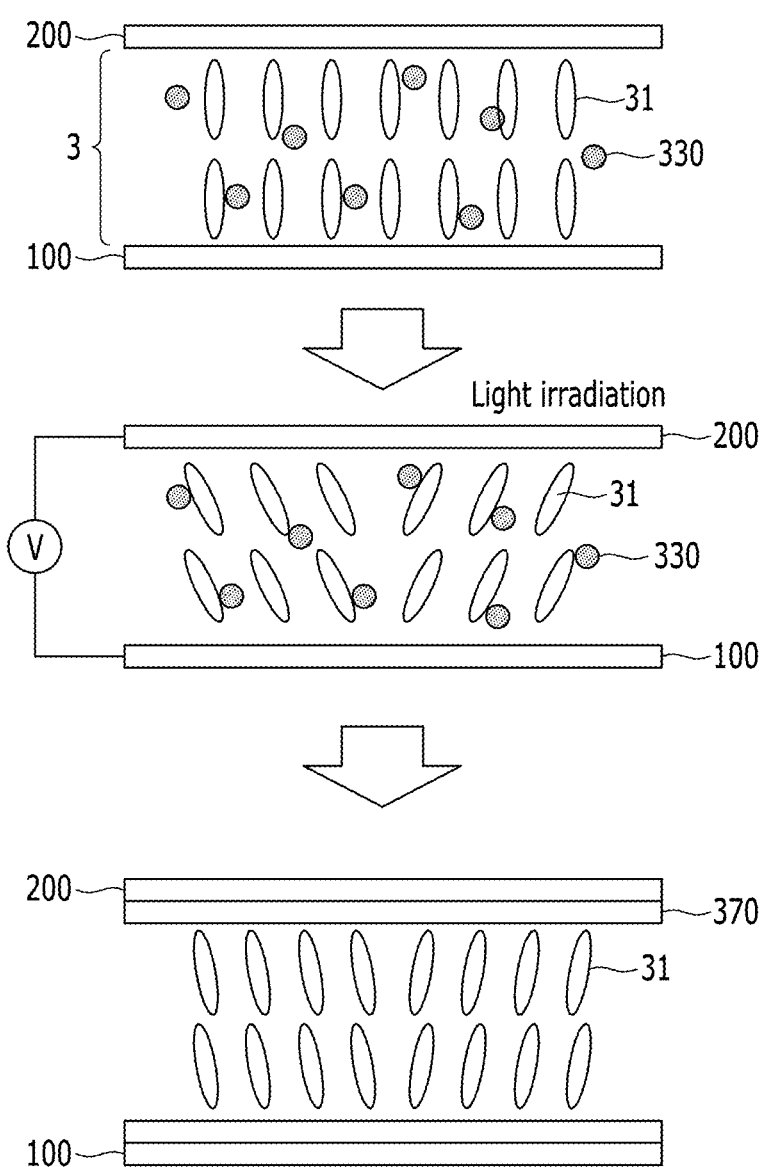
FIG. 10 is a view showing a process providing a pretilt angle to liquid crystal molecules by using prepolymers that are polarized by light such as ultraviolet rays.

FIG. 10 is a view showing a process of providing a pretilt angle to liquid crystal molecules by using prepolymers polarized by light such as ultraviolet rays.

Firstly, prepolymers 330, such as a monomer that is polymerized by light such as ultraviolet rays, are injected along with a liquid crystal material between the two display panels 100 and 200. The prepolymer 330 may be a reactive mesogen that is polymerized by light such as ultraviolet rays.

Next, through several methods, the first subpixel electrode 191a and the second subpixel electrode 191b of FIGS. 2 and 3 have voltages of different magnitudes applied thereto and the common electrode 270 of the upper panel 200 has the common voltage applied thereto so as to generate the electric field in the liquid crystal layer 3 between the two display panels 100 and 200. In response to the electric field, the liquid crystal molecules 31 of the liquid crystal layer 3 are tilted in directions parallel to the extending direction of the plurality of branch electrodes 194a of the first subpixel electrode 191a (FIG. 2) by the fringe field due to the plurality of branch electrodes 194a and the common electrode 270, and are tilted in directions parallel to the extending direction of the first branch electrodes 194b of the second subpixel electrode 191b (FIG. 2) by the fringe field due to a plurality of branch electrodes 194b of the second subpixel electrode 191b and the common electrode 270. In this case, the branch electrodes 194a and 194b are formed in the eight directions in the second to seventh zones (ⓑ, ⓒ, ⓓ, ⓔ, ⓕ, and ⓖ) and the inclination direction of the liquid crystal molecules 31 is determined according to the above directions. In this case, the branch electrodes 194a and 194b are formed in the four directions in the first zone (ⓐ) and the inclination direction of the liquid crystal molecules 31 is determined according to the above directions.

In this case, since the first subpixel electrode 191a and the second subpixel electrode 191b have different voltages applied to them, the inclination of the liquid crystal molecules 31 corresponding to the first subpixel electrode 191a and the inclination angle of the liquid crystal molecules 31 corresponding to the second subpixel electrode 191b are differentiated with respect to the first substrate 110.

After generating the electric field to the liquid crystal layer 3, if the light such as ultraviolet rays is irradiated, the prepolymers 330 are polymerized to form a polymer 370. The polymer 370 is formed while contacting the display panels 100 and 200. The alignment direction is determined for the liquid crystal molecules 310 to have the pretilt in the described direction by the polymer 370. Accordingly, the liquid crystal molecules 310 are arranged with the pretilts of four different directions under non-application of the voltage to the electrodes 191 and 270.

Next, a change of the pretilt of the liquid crystal molecules when forming the curved display device by bending the liquid crystal display according to an exemplary embodiment of the present invention after forming the pretilt of the liquid crystal molecules as described in FIG. 10 in the state of the flat display device will be described with reference to FIG. 11 to FIG. 15. Also, it is compared with the pretilt of the liquid crystal molecules of the general liquid crystal display for reference.

In the general liquid crystal display for reference, the shape of the pixel electrode is formed to be the same in the entire zone. Particularly, the minute branches form the same angle with the transverse stem, and the minute branches extend to the left-upper side, the left-lower side, the right-upper side, and the right-lower side, that is, four directions from the transverse stem and the longitudinal stem.

Figure 11:
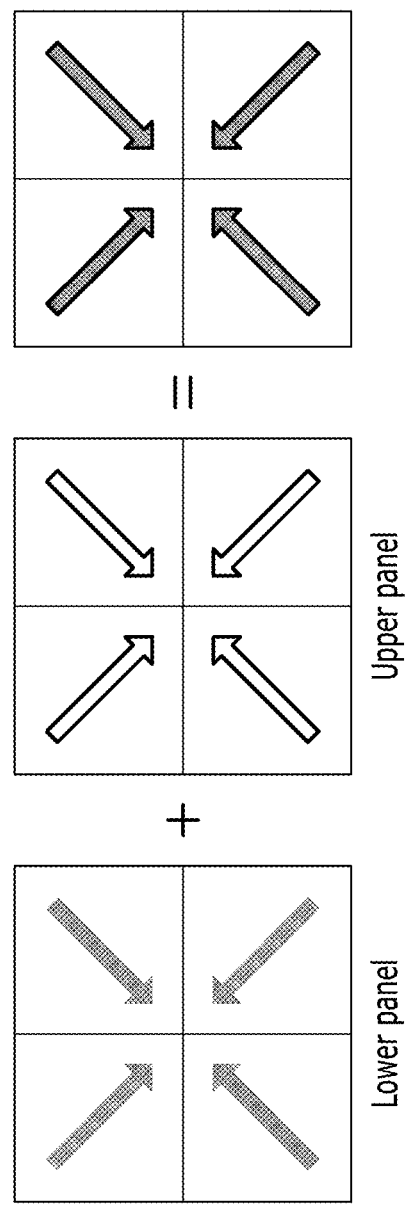
FIG. 11 is a view showing a pretilt direction of a liquid crystal molecule of a general flat liquid crystal display.
Figure 12:
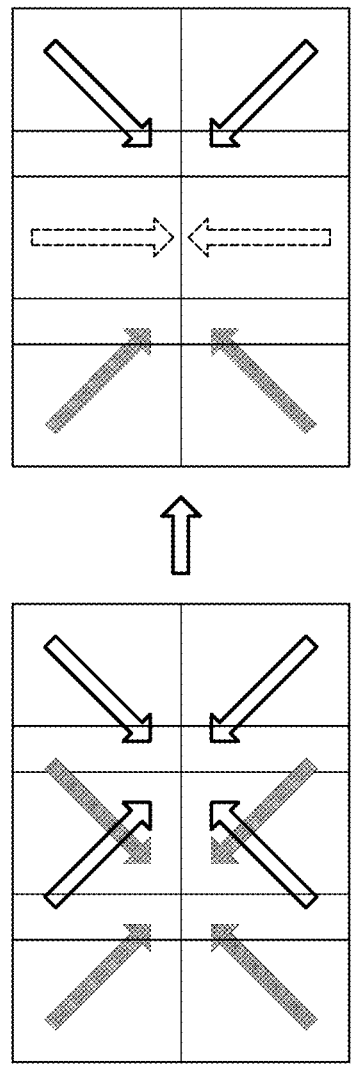
FIG. 12 is a view showing a pretilt direction of a liquid crystal molecule when bending a general liquid crystal display.
Figure 13:
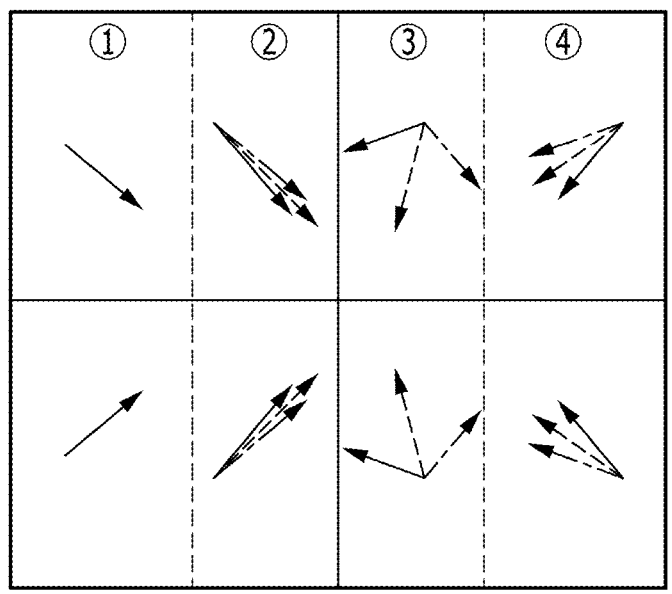
FIG. 13 is a view showing a pretilt direction of a liquid crystal molecule when bending a liquid crystal display according to an exemplary embodiment of the present invention.
Figure 14:
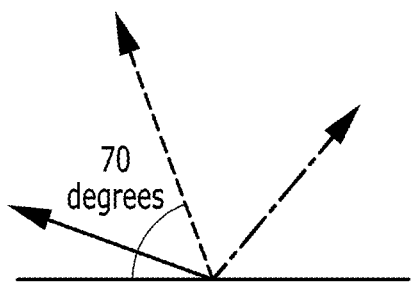
FIG. 14 is a vector view of a pretilt direction of a liquid crystal molecule in a third sub-region of a liquid crystal display according to an exemplary embodiment of the present invention.
Figure 15:
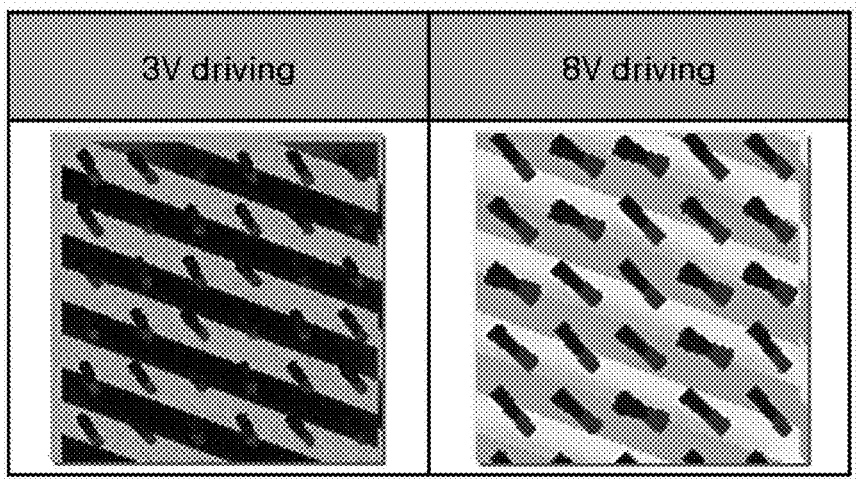
FIG. 15 is a view showing a direction of a liquid crystal molecule in a third zone when actually driving a liquid crystal display according to an exemplary embodiment of the present invention.

FIG. 11 is a view showing a pretilt direction of a liquid crystal molecule of a general flat liquid crystal display, and FIG. 12 is a view showing a pretilt direction of a liquid crystal molecule when bending a general liquid crystal display. FIG. 13 is a view showing a pretilt direction of a liquid crystal molecule when bending a liquid crystal display according to an exemplary embodiment of the present invention, FIG. 14 is a vector view of a pretilt direction of a liquid crystal molecule in a third sub-region of a liquid crystal display according to an exemplary embodiment of the present invention, and FIG. 15 is a view showing a direction of a liquid crystal molecule in a third zone when actually driving a liquid crystal display according to an exemplary embodiment of the present invention.

As shown in FIG. 11, if the initial alignment to have the pretilt is performed in the general flat liquid crystal display as shown in FIG. 10, the pretilt direction of the liquid crystal molecule in the lower panel is four directions according to the shape of the minute branches. Likewise for the upper panel, the pretilt direction of the liquid crystal molecule is four directions according to the shape of the minute branches. The pretilt direction of the liquid crystal molecule in the lower panel and the pretilt direction of the liquid crystal molecule of the upper panel accord with each other, and the pretilt direction of the liquid crystal molecule is four directions.

If the flat liquid crystal display is bent, as shown in FIG. 12, a misalignment is generated between the upper panel and the lower panel. For example, the upper panel may be positioned further to the right side than the lower panel. Accordingly, the pretilt direction of the liquid crystal molecule in the lower panel and the pretilt direction of the liquid crystal molecule in the upper panel are partially not in agreement. In the portion in which the pretilt direction of the liquid crystal molecule in the lower panel and the pretilt direction of the liquid crystal molecule in the upper panel are different, the pretilt direction of the liquid crystal molecule may finally be about the 90-degree direction with respect to the transverse stem. Accordingly, the final pretilt direction of the liquid crystal molecule may be six directions.

In the liquid crystal display according to an exemplary embodiment of the present invention, as shown in FIG. 13, when the flat liquid crystal display is initially aligned to have the pretilt and is bent to form the curved liquid crystal display, the pretilt direction of the liquid crystal molecule of the lower panel finally becomes the pretilt direction of the liquid crystal molecule in the first sub-region (①). A vector sum of the pretilt direction of the liquid crystal molecule of the lower panel of the second sub-region (②) and the pretilt direction of the liquid crystal molecule of the upper panel positioned at the first sub-region (①) before the bending process finally becomes the pretilt direction of the liquid crystal molecule in the second sub-region (②). A vector sum of the pretilt direction of the liquid crystal molecule of the lower panel of the third sub-region (③) and the pretilt direction of the liquid crystal molecule of the upper panel positioned at the second sub-region (②) before the bending process finally becomes the pretilt direction of the liquid crystal molecule in the third sub-region (③). A vector sum of the pretilt direction of the liquid crystal molecule of the lower panel of the fourth sub-region (④) and the pretilt direction of the liquid crystal molecule of the upper panel positioned at the third sub-region (③) before the bending process finally becomes the pretilt direction of the liquid crystal molecule in the fourth sub-region (④).

By forming the pretilt direction of the liquid crystal molecule of the lower panel at more than 45 degrees in the second sub-region (②) and the pretilt direction of the liquid crystal molecule of the lower panel at less than 45 degrees in third sub-region (③), the final pretilt direction of the liquid crystal molecule may be formed to be similar in all sub-regions (①, ②, ③, and ④). Particularly, the final pretilt direction of the liquid crystal molecule may be formed to be close to 45 degrees by the transverse stem.

As shown in FIG. 14, in the third sub-region (③), the difference of the pretilt directions of the liquid crystal molecule of the upper panel and the lower panel is large. For example, when the angle between the minute branches and the transverse stem in the second sub-region (②) is 50 degrees and the angle between the minute branches and the transverse stem in the third sub-region (③) is 20 degrees, the vector sum of the pretilt direction of the liquid crystal molecule of the lower panel and the pretilt direction of the liquid crystal molecule of the upper panel becomes about 70 degrees. Accordingly, the angle of the final pretilt direction of the liquid crystal molecule by the transverse stem is larger than 45 degrees.

This pretilt direction largely affects the direction of the liquid crystal molecule in the low voltage driving but it is not affected in high voltage driving. As shown in FIG. 15, the direction of the long axis of the liquid crystal molecule is aligned to be close to 70 degrees in the 3V low voltage, however the direction of the long axis of the liquid crystal molecule is decreased from 70 degrees in the 8V high voltage, thereby showing the angle near 45 degrees. Since an electric force due to the voltage applied to the minute branches of the lower panel is larger than the force controlling the pretilt direction in the high voltage driving, the formation direction of the minute branches is an important factor for determining the long axis direction of the liquid crystal molecule.

Next, a characteristic that the texture generated by the misalignment of the upper and the lower panels is reduced in the liquid crystal display according to an exemplary embodiment of the present invention will be described with reference to FIG. 16 and FIG. 17. Also, it is compared with the pretilt of the liquid crystal molecules of the general liquid crystal display for reference.

Figure 16:
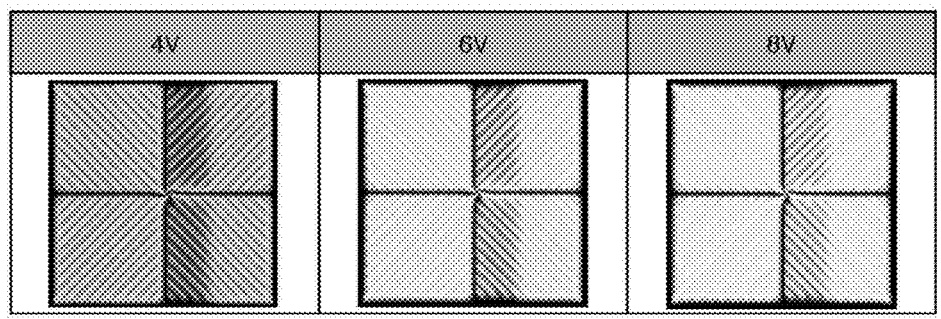
FIG. 16 shows simulation data of a pixel electrode of a general liquid crystal display.
Figure 17:
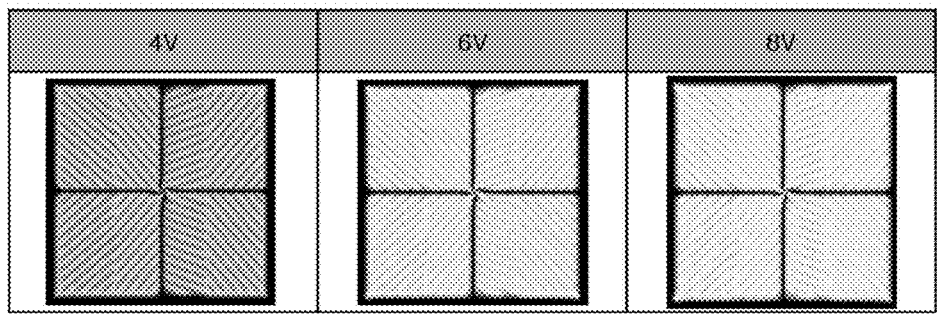
FIG. 17 shows simulation data of a pixel electrode of a liquid crystal display according to an exemplary embodiment of the present invention.

FIG. 16 shows simulation data of a pixel electrode of a general liquid crystal display, and FIG. 17 shows simulation data of a pixel electrode of a liquid crystal display according to an exemplary embodiment of the present invention. FIG. 16 shows a shape in which light is transmitted for each voltage after forming the curved liquid crystal display by bending the general liquid crystal display, and FIG. 17 shows a shape in which light is transmitted for each voltage after forming the curved liquid crystal display by bending the liquid crystal display according to an exemplary embodiment of the present invention.

As shown in FIG. 16, it may be confirmed that a dark texture appears in the partial region positioned at the right side with reference to the longitudinal stem. When the voltage applied to the pixel electrode is respectively 4 V, 6 V, and 8 V, the respective texture appears.

As shown in FIG. 17, in the liquid crystal display according to an exemplary embodiment of the present invention, there is no portion that is dark compared with other portions, and it may be confirmed that the entire brightness of the pixel electrode is constant. That is, the texture is not generated in the region positioned at the right side with reference to the longitudinal stem.

Next, the change of the angle of the minute branches by the transverse stem in each sub-region will be described with reference to FIG. 18 to FIG. 20.

Figure 18:
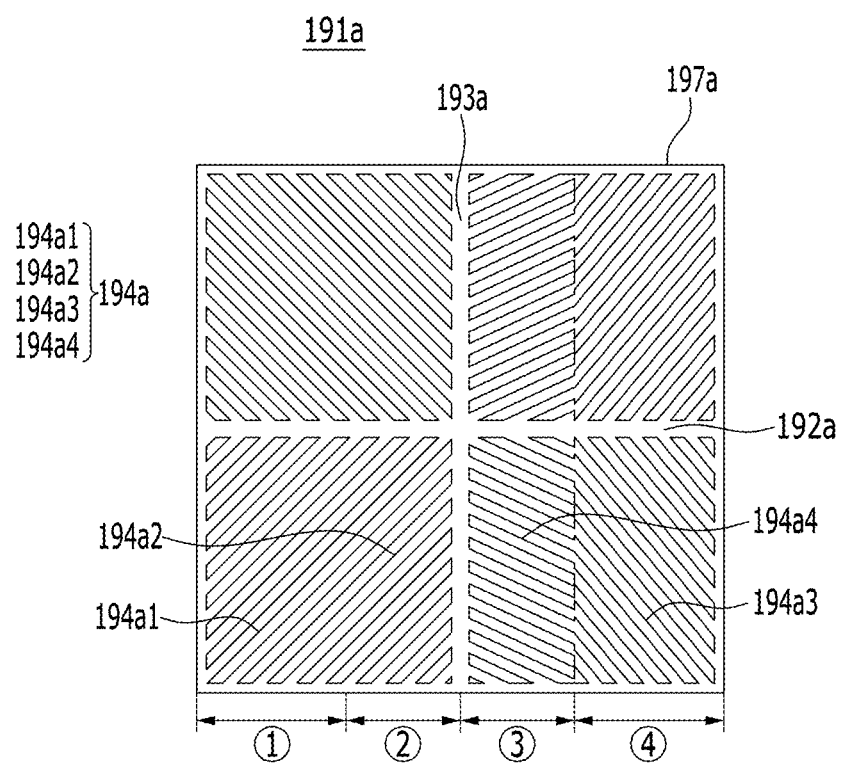
FIG. 18 to FIG. 20 are top plan views of a first sub-pixel electrode of one pixel of a liquid crystal display according to another exemplary embodiment of the present invention.
Figure 19:
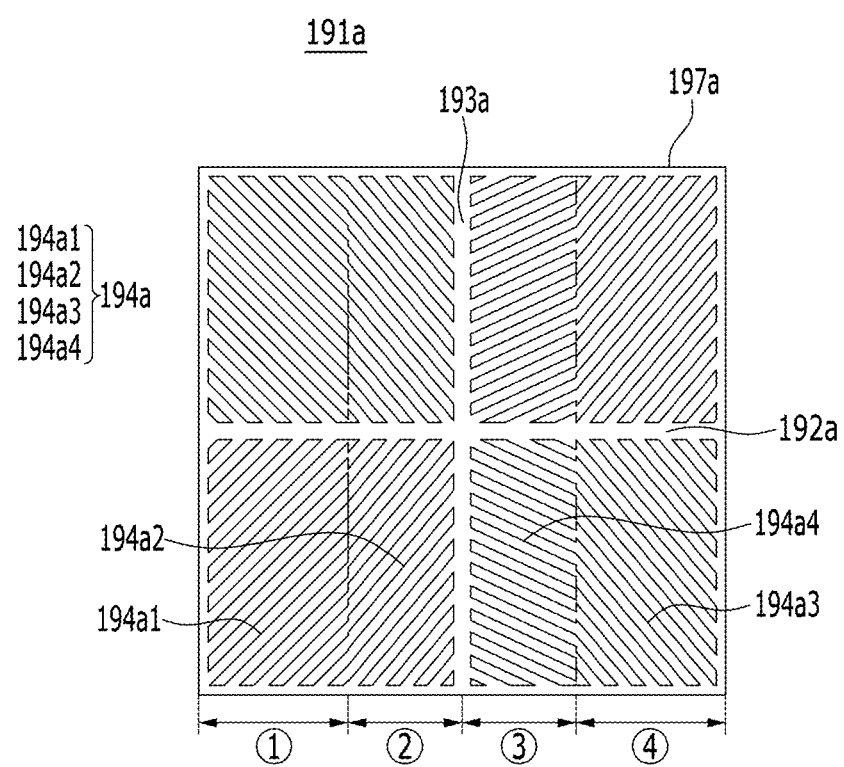
Figure 20:
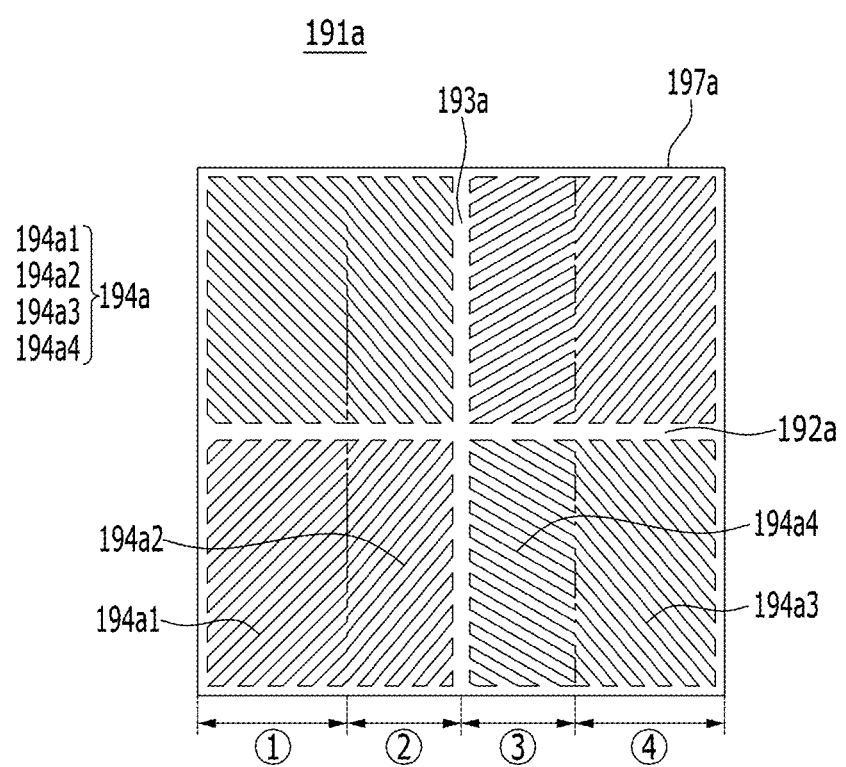

FIG. 18 to FIG. 20 are top plan views of a first sub-pixel electrode of one pixel of a liquid crystal display according to another exemplary embodiment of the present invention.

As shown in FIG. 18, the minute branches 194a1 of the first sub-region (①) form the angle of about 45 degrees with the transverse stem 192a, the minute branches 194a2 of the second sub-region (②) form the angle of about 45 degrees with the transverse stem 192a, the minute branches 194a3 of the third sub-region (③) form the angle of about 25 degrees with the transverse stem 192a, and the minute branches 194a4 of the fourth sub-region (④) form the angle of about 50 degrees with the transverse stem 192a.

As shown in FIG. 19, the minute branches 194a1 of the first sub-region (①) form the angle of about 45 degrees with the transverse stem 192a, the minute branches 194a2 of the second sub-region (②) form the angle of about 50 degrees with the transverse stem 192a, the minute branches 194a3 of the third sub-region (③) form the angle of about 25 degrees with the transverse stem 192a, and the minute branches 194a4 of the fourth sub-region (④) form the angle of about 50 degrees with the transverse stem 192a.

As shown in FIG. 20, the minute branches 194a1 of the first sub-region (①) form the angle of about 45 degrees with the transverse stem 192a, the minute branches 194a2 of the second sub-region (②) form the angle of about 50 degrees with the transverse stem 192a, the minute branches 194a3 of the third sub-region (③) form the angle of about 30 degrees with the transverse stem 192a, and the minute branches 194a4 of the fourth sub-region (④) form the angle of about 50 degrees with the transverse stem 192a.

Next, transmittance of the liquid crystal display according to an exemplary embodiment of the present invention will be described with reference to FIG. 21 and FIG. 22.

Figure 21:
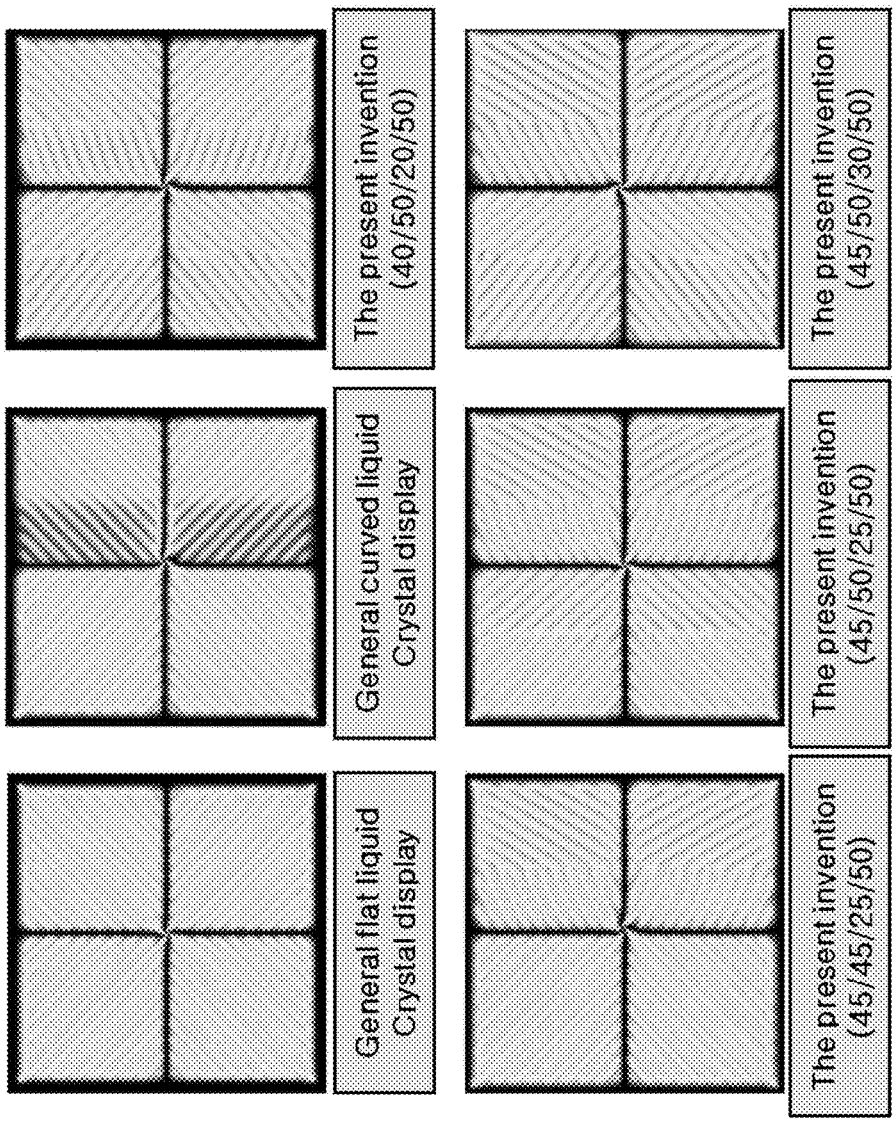
FIG. 21 shows simulation data of a pixel electrode of a general liquid crystal display and a liquid crystal display according to an exemplary embodiment of the present invention.

FIG. 21 shows simulation data of a pixel electrode of a general liquid crystal display and a liquid crystal display according to an exemplary embodiment of the present invention, and FIG. 22 is a graph showing transmittance of the general liquid crystal display and the liquid crystal display according to an exemplary embodiment of the present invention of FIG. 21.

As shown in FIG. 21, when the alignment of the upper and lower panels is correct in the flat liquid crystal display, the region where the texture is generated does not appear. When forming the curved liquid crystal display by bending the general flat liquid crystal display, the misalignment of the upper and lower panels is generated such that it may be confirmed that the texture darkly appears in the region positioned at the right side with reference to the longitudinal stem.

In the case of the liquid crystal display according to an exemplary embodiment of the present invention, it is confirmed that there is no region where the texture is generated. A case of (40/50/20/50), a case of (45/45/25/50), a case of (45/50/25/50), and a case of (45/50/30/50) appear according to the magnitude of the angle of the minute branches in the first, the second, the third, and the fourth sub-region.

FIG. 22 shows the transmittance in the four exemplary embodiments compared with the general liquid crystal display. When the transmittance of the curved liquid crystal display formed by bending the general flat liquid crystal display is assumed to be 100, the transmittance of the flat liquid crystal display before the bending process is 106.48. In the liquid crystal display according to an exemplary embodiment of the present invention, transmittance between about 103 to 105 appears, and the transmittance that is higher than the general curved liquid crystal display appears. Particularly, in the case of the angle of the minute branches in the first sub-region to fourth sub-region of (45/45/25/50), the highest transmittance appears.

In the liquid crystal display according to an exemplary embodiment of the present invention, by designing the shape of the minute branches for an azimuth angle of the final liquid crystal molecules to be formed close to 45 degrees, the texture generated by the misalignment of the upper and lower panels when realizing the curved liquid crystal display is prevented, thereby improving the transmittance.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A liquid crystal display, comprising:
   a flexible first substrate;
   a pixel electrode positioned on the first substrate and including an outer stem with a quadrangular shape, a crossed-shape stem including a transverse stem positioned inside the outer stem and a longitudinal stem crossing the transverse stem, and a plurality of minute branches extending from the outer stem and the crossed-shape stem;
   a flexible second substrate facing the first substrate;
   a common electrode positioned on the second substrate; and
   a liquid crystal layer including liquid crystal molecules interposed between the first substrate and the second substrate;
   wherein the liquid crystal display includes a first zone positioned at a center thereof, a second zone positioned at a right side of the first zone, a third zone positioned at a right side of the second zone, and a fourth zone positioned at a right side of the third zone;
   wherein the pixel electrode includes a first sub-region positioned at a leftmost side, a second sub-region positioned at a right side of the first sub-region, a third sub-region positioned at a right side of the second sub-region, and a fourth sub-region positioned at a right side of the third sub-region; and
   wherein an angle formed by the minute branches of the third sub-region of the pixel electrode positioned at the second, the third, and the fourth zones and the transverse stem is smaller than an angle formed by the minute branches of the first, the second, and the fourth sub-regions of the pixel electrode positioned at the second, the third, and the fourth zones and the transverse stem.

2. The liquid crystal display of claim 1, wherein the angle formed by the minute branches of the first sub-region of the pixel electrode positioned at the second, the third, and the fourth zones and the transverse stem is more than 35 degrees and less than 45 degrees, the angle formed by the minute branches of the second sub-region of the pixel electrode positioned at the second, the third, and the fourth zones and the transverse stem is more than 45 degrees and less than 80 degrees, the angle formed by the minute branches of the third sub-region of the pixel electrode positioned at the second, the third, and the fourth zones and the transverse stem is more than 10 degrees and less than 40 degrees, and the angle formed by the minute branches of the fourth sub-region of the pixel electrode positioned at the second, the third, and the fourth zones and the transverse stem is more than 45 degrees and less than 70 degrees.

3. The liquid crystal display of claim 2, wherein a width of the second sub-region and the third sub-region is widened from the second zone to the fourth zone.

4. The liquid crystal display of claim 3, wherein the width of the second sub-region is the same as the width of the third sub-region.

5. The liquid crystal display of claim 3, wherein:
the width of the second sub-region and the third sub-region in the third zone is two times the width of the second sub-region and the third sub-region in the second zone, and
the width of the second sub-region and the third sub-region in the fourth zone is three times the width of the second sub-region and the third sub-region in the second zone.

6. The liquid crystal display of claim 3, wherein the width of the first sub-region and the fourth sub-region is decreased from the second zone to the fourth zone.

7. The liquid crystal display of claim 6, wherein the width of the first sub-region is the same as the width of the fourth sub-region.

8. The liquid crystal display of claim 3, wherein a width from the first zone to the fourth zone is constant.

9. The liquid crystal display of claim 3, wherein the angle formed by the minute branches of the first, the second, the third, and the fourth sub-regions of the pixel electrode positioned at the first zone and the transverse stem is constant.

10. The liquid crystal display of claim 9, wherein the angle formed by the minute branches of the pixel electrode positioned at the first zone and the transverse stem is more than 40 degrees and less than 45 degrees.

11. The liquid crystal display of claim 3, wherein the longitudinal stem is positioned at a boundary between the second sub-region and the third sub-region.

12. The liquid crystal display of claim 11, wherein the boundary between the first sub-region and the second sub-region and the boundary between the third sub-region and the fourth sub-region are parallel to the longitudinal stem.

13. The liquid crystal display of claim 3, wherein the first substrate and the second substrate are curved in a first direction.

14. The liquid crystal display of claim 13, wherein the first direction is parallel to the transverse stem.

15. The liquid crystal display of claim 14, wherein the first substrate and the second substrate have a constant curvature.

16. The liquid crystal display of claim 3, wherein a boundary between the first zone and the second zone, a boundary between the second zone and the third zone, and a boundary between the third zone and the fourth zone are parallel to the longitudinal stem.

17. The liquid crystal display of claim 3, wherein the first substrate further includes a fifth zone positioned at the left side of the first zone, a sixth zone positioned at the left side of the fifth zone, and a seventh zone positioned at the left side of the sixth zone.

18. The liquid crystal display of claim 17, wherein:
a shape of minute branches of the pixel electrode positioned at the fifth zone is symmetrical to a shape of the minute branches of the pixel electrode positioned at the second zone;
a shape of minute branches of the pixel electrode positioned at the sixth zone is symmetrical to a shape of the minute branches of the pixel electrode positioned at the third zone; and
a shape of minute branches of the pixel electrode positioned at the seventh zone is symmetrical to a shape of the minute branches of the pixel electrode positioned at the fourth zone.

19. The liquid crystal display of claim 3, wherein the liquid crystal layer includes liquid crystal molecules and a reactive mesogen.

20. The liquid crystal display of claim 3, further comprising:
a first alignment layer positioned on the first substrate; and
a second alignment layer positioned on the second substrate;
wherein the first alignment layer and the second alignment layer are made of an alignment material including a reactive mesogen.

* * * * *